United States Patent [19]
Keller

[11] Patent Number: 5,664,522
[45] Date of Patent: Sep. 9, 1997

[54] ANIMAL FEEDING APPARATUS

[76] Inventor: Cyril N. Keller, 1802 Connell Dr., Fergus Falls, Minn. 56537

[21] Appl. No.: 411,491

[22] Filed: Mar. 28, 1995

[51] Int. Cl.[6] ............... A01K 5/00; A01K 39/01
[52] U.S. Cl. .................... 119/52.3; 119/51.03
[58] Field of Search ............... 119/51.03, 52.2, 119/52.3, 57.9

[56] References Cited

U.S. PATENT DOCUMENTS

| | | | |
|---|---|---|---|
| D. 330,612 | 10/1992 | Leach | D30/121 |
| 392,834 | 11/1888 | Turner | 119/791 |
| 1,751,388 | 3/1930 | Bircher . | |
| 3,537,429 | 11/1970 | Regan | 119/51.03 |
| 3,638,617 | 2/1972 | White . | |
| 3,645,235 | 2/1972 | Suchla | 119/52.2 |
| 4,632,062 | 12/1986 | Hubbard | 119/51.03 |
| 4,767,088 | 8/1988 | Fielder et al. | 119/57.9 X |
| 5,119,765 | 6/1992 | Roush, Jr. | 119/57.91 |
| 5,195,460 | 3/1993 | Loken | 119/52.3 X |

*Primary Examiner*—Robert P. Swiatek
*Attorney, Agent, or Firm*—Moore & Hansen

[57] ABSTRACT

A squirrel or small animal feeding apparatus comprises a mounting post, an angular mounting member, a pivot arm rotatably mounted to the angular mounting member, and a combination of eye hooks for attaching either a corn cob or a small bird feeder to one end of the pivot arm. The animal feeding apparatus further comprises a slidably moveable counterweight, the counterweight being mountable to the pivot arm in order to counterbalance the weight of an animal climbing onto the animal feeder. When an animal climbs up the pivot arm to get at the food attached to the eye hook assembly, the pivot arm will rotate in either direction, causing the animal to swing across the bottom.

16 Claims, 1 Drawing Sheet

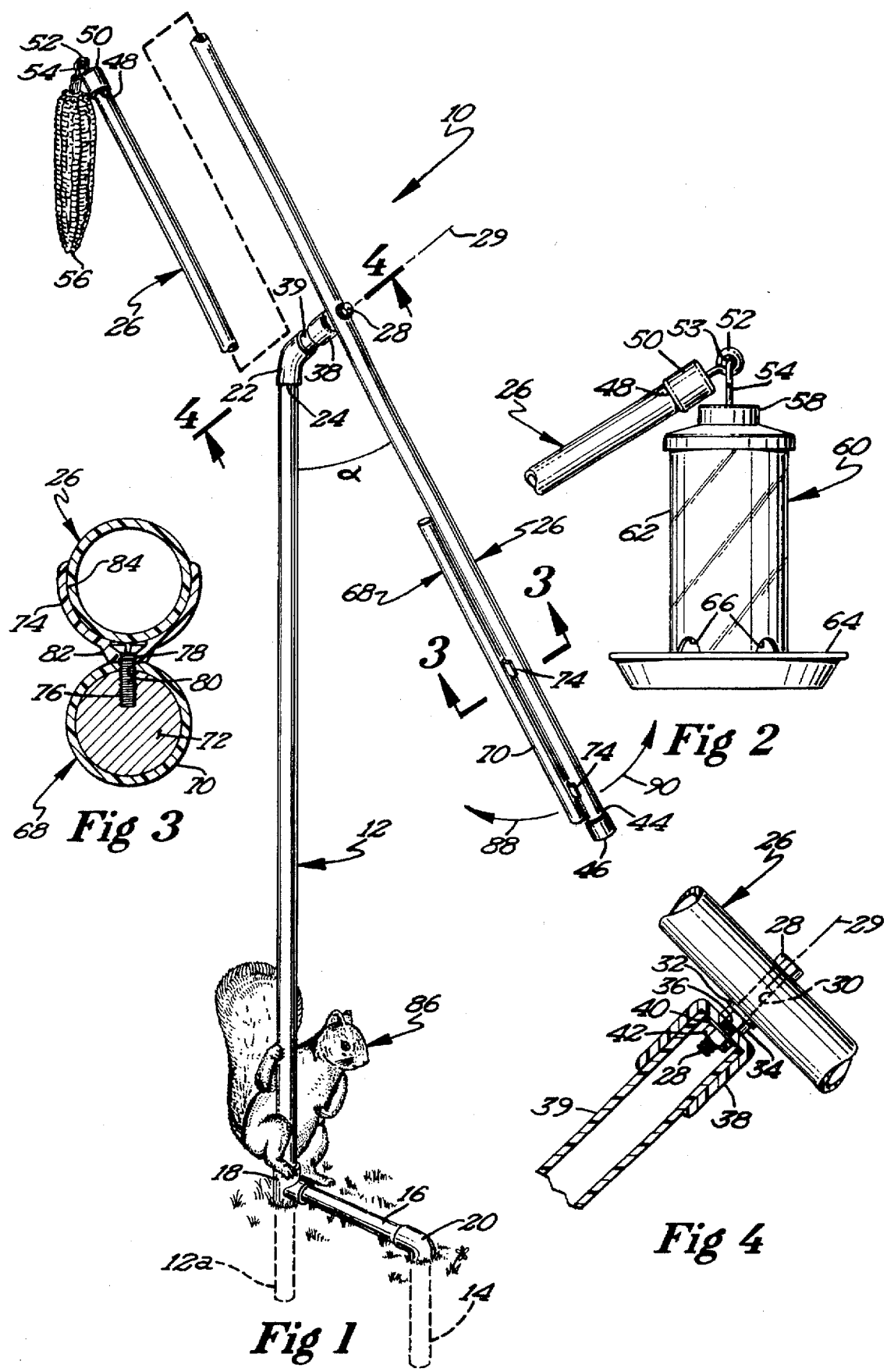

ANIMAL FEEDING APPARATUS

BACKGROUND OF THE INVENTION

The present invention relates to the field of animal feeders. Specifically, it relates to a small animal feeding apparatus such as a feeder for squirrels.

Squirrels have a way of defeating most methods devised to keep them from eating food in a feeder that is meant for birds. As anyone who has attempted to prevent squirrels from getting access to a bird feeder knows, the task is nearly impossible. Squirrels are tenacious, and will keep finding ways to defeat anti-squirrel devices on bird feeders.

It is this tenaciousness that has led people to believe that squirrels could provide enjoyment for spectators if the spectators were to be able to watch squirrels play. Indeed, squirrels will climb onto squirrel or bird feeders to get food even though the feeder rotates or moves as the squirrels attempt to obtain the food. Several moving or rotating squirrel feeders exist in the prior art.

For example, U.S. Pat. No. 4,632,062, issued to Hubbard, discloses a squirrel feeder comprised of a wooden arm pivotally mounted off center. The short end of the arm has an ear of corn attached thereto by mounting it with its long axis along the long axis of the arm. The off center mount has one portion of the arm significantly heavier than the other, causing the heavier part of the arm to rotate downward so the corn normally is at the high end, with the arm resting substantially vertically. A squirrel can hop onto the Hubbard feeder and as the squirrel gets near the corn, its weight may cause the arm to rotate, swinging the squirrel to the lower position. However, this type of feeder's purpose of providing entertainment is limited by the fact that squirrels have very acute balance. Some squirrels could climb onto the Hubbard feeder and eat the corn without causing the arm to rotate. Further, squirrels can easily hang onto the wood with their paws, and even though the wood rotates, the squirrels could hang on to eat as much corn as they wish. Therefore, the only rotation of the Hubbard device would be one rotation of the arm so that the corn and squirrel were in the lower position. Additionally, since the Hubbard squirrel feeder is generally mounted to a tree, a squirrel could potentially remain on the tree and eat the corn without ever venturing onto the squirrel feeder.

Another animal feeder is described in U.S. Pat. No. 5,119,765, issued to Roush, Jr. Roush, Jr. discloses an animal feeder with a pivotally mounted hollow tube, the tube containing food. The tube has open ends that may be covered with diaphragms, the diaphragms serving the function of metering food distribution. The tube may rotate only through a restricted arc. A stop member restricts the arc of motion of the pivotally mounted tube. When a squirrel or other animal climbs up the tube, its weight will cause the tube to rotate, the granular food contained in the tube will shift, and the tube with the animal on it will rotate down until it contacts the stop member. When this happens, since the food is shifting or has shifted to the now low end, a quantity of food is ejected from the tube, and the animal can eat the food. The tube then remains in its new position until the same or another animal climbs up the tube once again and rotates the tube in the other direction. This method of food distribution requires the squirrel or other small animal to climb the tube and allow it to rotate down to get food. The only rotation involved in Roush, Jr. is the limited arc of rotation of the tube, the arc of rotation being limited by the stop member. The stop member is further required in case the granular food does not shift when the pivotally mounted tube rotates downward. When the tube hits the stop member, the jarring force should shake the food loose so that it may slide down to the now low end of the tube.

These and other squirrel or small animal feeders involve a limited amount of rotation, and although they may provide a degree of entertainment, the entertainment is limited by the fact that only a small amount of rotation is involved. Further, due to their balance, squirrels may be able to get at the food without even rotating the feeders. Additionally, squirrels can easily hang on to a wood surface and eat their fill without getting off of the feeder or causing it to continue rotating.

BRIEF SUMMARY OF THE INVENTION

It is an objective of the present invention to provide a squirrel or small animal feeding apparatus capable of defeating the balance of small animals so that the feeder will rotate when an animal attempts to get food.

It is another objective of the present invention to provide a small animal feeding apparatus with an adjustable counterweight so that the balance of the feeder may be tailored to the type of the animal which is feeding from it.

It is still another objective of the present invention to provide a small animal feeding apparatus constructed of a material that will not allow a squirrel or small animal to get a good enough grip on the feeder to eat the food obtained without jumping off the feeder.

The present invention accomplishes these objectives by providing a small animal feeding apparatus with a pivot arm rotatably mounted on a substantially upright mounting post at substantially a forty-five degree angle to the mounting post by an angular mounting member. The pivot arm has at one end means for attaching a cob of corn or a small bird feeder. The opposite end of the pivot arm is filled with sand or other material for a partial counterweight. An additional, moveable counterweight is slidably attached to the pivot arm. This counterweight may be moved along the pivot arm to allow proper balancing of the pivot arm. In this manner, the counterweight position may be adjusted to balance the pivot arm for the approximate weight of the animal expected to feed on the animal feeding apparatus. For example, for a heavier animal, the counterweight would be moved more toward the weighted end of the pivot arm, and for a lighter animal, the counterweight would be moved more toward the opposite end. The counterweight may be adjusted so that a bird as light as a nut hatch will cause the pivot arm to rotate.

The means for attaching a cob of corn or a small bird feeder to the unweighted end of the pivot arm includes an eye hook screwed into a cap on the end of the pivot arm, and another larger eye hook linked with the eye of the smaller eye hook. A cob of corn may be screwed onto the larger eye hook, and will hang generally vertically down from the end of the pivot arm. Similarly, the bird feeder may be attached to either the small eye hook or the large eye hook. A bird feeder so attached will also hang down from the eye hook of the pivot arm.

Because the cob of corn or bird feeder hangs down from the end of the pivot arm, a squirrel attempting to reach the food must reach around the side of the arm to get to the food. By doing this, the squirrel will unbalance the pivot arm, causing it to rotate in either direction, swinging the squirrel across the bottom.

The feeding apparatus is constructed of PVC pipe. The PVC pipe is smooth. Due to the smoothness of the pipe, a squirrel must hang onto the pivot arm with all four paws to remain on the arm. The squirrel can use its mouth to get food, but must use two of its paws to eat, which means that it must hop off of the feeding apparatus to eat the food it has gathered. When the squirrel or other animal hops off the feeding apparatus, the weighted pivot end will return the arm to its original position. A typical squirrel will usually repeat the food gathering process on the feeding apparatus about twenty-five times in order to be satisfied.

These and other objects and benefits of the present invention will become apparent from the following detailed description thereof taken in conjunction with the accompanying drawings, wherein like reference numerals designate like elements throughout the several views.

DESCRIPTION OF THE DRAWINGS

FIG. 1 is a perspective view of an embodiment of the present invention with a squirrel climbing thereon;

FIG. 2 is an enlarged view of the eye hook end of the rotating pivot arm with a feeder attached thereto;

FIG. 3 is a cross-sectional view of the structure of the counterweight and pivot arm taken along lines 3—3 of FIG. 1; and FIG. 4 is a partial section view of the attachment of the pivot arm to the mounting member, taken along lines 4—4 of FIG. 1.

DESCRIPTION OF THE PREFERRED EMBODIMENT

Referring to FIG. 1, the animal feeding apparatus 10 may be seen. The animal feeding apparatus includes a mounting post 12, and depending leg 14 attached to mounting post 12 by cross member 16. Depending leg 14 acts as a second mounting post. Appropriate T and elbow joints 18 and 20 connect the parts, although other suitable connections could also be made, such as are appropriate to the material being used. A mounting member 22 is preferably attached to the first end at top 24 of mounting post 12. Although mounting member 22 is preferably attached at or near top 24 of mounting post 12, any connection point at an above ground elevation which would allow free rotation of a pivot arm 26 rotatably mounted to mounting member 22 or mounting post 12 would also be suitable. Alternatively, mounting member 22 may be formed integrally with mounting post 12 by bending mounting post 12 to the desired angle. Pivot arm 26 is rotatable in a plane oriented at an angle α to the mounting post 12. The preferred angle α between mounting post 12 and the plane is approximately 45 degrees. The preferred mounting for pivot arm 26 is to insert bolt 28 through a hole 30 in pivot arm 26, through washer and nut 32 and 34, through hole 36 in cap 38 placed on short connecting piece 39 which is situated between mounting member 22 and cap 38, then through washer and nut 40 and 42, as best shown in FIG. 4. If the mounting member 22 is formed integrally with mounting post 12, then no connecting piece 39 may be necessary, and pivot arm 26 may be mounted directly to mounting post 12. Bolt 28 defines an axis 29 around which pivot arm 26 can rotate. With this mounting, the pivot arm 26 is free to rotate in either a counter clockwise or clockwise direction about axis 29.

Mounting post 12 and pivot arm 26 are preferably constructed from PVC pipe, having a diameter between about ½ inch and 2 inches, although a diameter of approximately ¾ inch is preferred. This diameter of smooth PVC pipe will allow a squirrel to grip the pipe using four paws, but the squirrel will be unable to grip the pipe using only two paws.

End 44 of pivot arm 26 is covered by cap 46. The portion of pivot arm 26 between end 44 and bolt 28 may by partially filled with sand or other material to provide a partial counterweight for the pivot arm 26. Opposite end 48 of pivot arm 26 has a cap 50 and means for supporting animal food attached thereto. For example, an eye hook 52 may be screwed into cap 50 to provide a means for supporting animal food including corn or a small animal feeder such as a bird feeder to the pivot arm 26. In the preferred embodiment, a second eye hook 54 is hooked to the eye 53 of the first eye hook 52. The second eye hook 54 may be used to screw into a cob of corn 56 to suspend the corn 56 from end 48 of pivot arm 26. Alternatively, eye hook 54 could be threaded into the cap 58 of a bird feeder 60. The cap 58 in turn would be screwed to the body 62 of the feeder 60, as best shown in FIG. 2. Feeder 60 could be a commercial bird feeder. However, feeder 60 need not be a commercial feeder but could be constructed from a bottle commonly used to hold beverages. Body 62 of the feeder 60 would be the bottle part of the beverage container, and the cap 58 the cap to the beverage container. A tray 64 could by mounted to the bottom of the bottle 62 to form a tray in which feed could sit. A hole or holes 66 could be cut in the bottom of the body 62 to provide an egress for food from the container 62.

A slidably moveable counterweight 68 may be attached to pivot arm 26. Counterweight 68 includes a length of PVC pipe 70 that is filled with sand or other material 72 to provide weight. A mounting means such as a plurality of mounting clips 74 is attached to the length of pipe 70. Each mounting clip 74 is attached to length of pipe 70 by a fastener such as screw 76 through holes 78 and 80 in mounting clip 74 and length of pipe 70, respectively. Referring to FIG. 3, mounting clip 74 may be seen to have a seat 82 which fits the contours of length of pipe 70 to provide a secure mount for mounting clip 74. Similarly, hole 78 in mounting clip 74 is countersunk so that the inner surface 84 of mounting clip 74 more closely conforms to the shape of pivot arm 26. Mounting clips 74 are substantially C-shaped in cross section. This allows the mounting clips 74 to form a deformable friction fit over pivot arm 26, allowing the counterweight 68 to be snapped into place in varying positions along the pivot arm 26 or to be slidably moved on the pivot arm 26. Alternatively, mounting clips 74 may be fashioned from partial sections of PVC pipe, and mounted to length of pipe 70 in the same fashion as mentioned above.

The animal feeding apparatus 10 operates as follows. The sand filled end 44 of pivot arm 26 serves as a partial counterweight to rotate pivot arm 26 such that end 48 is elevated and such that corn 56 or feeder 60 hangs substantially vertically from the upper end 48 of pivot arm 26. Moveable counterweight 68 may be snapped onto pivot arm 26 at a point suitable to balance the pivot arm 26 such that a squirrel 86 must move all the way up the pivot arm 26 near the end 48 in order to cause the pivot arm 26 to rotate. Moveable counterweight 68 may be slidably moved to varying positions along pivot arm 26, so that the amount of weight causing pivot arm 26 to rotate is adjustable. For heavier animals, the counterweight will be moved toward end 44 of pivot arm 26 and for lighter animals, such as birds, the counterweight 68 may be moved away from end 44 and more toward end 48 of pivot arm 26.

If the animal feeding apparatus 10 is adjusted so that the weight of a bird will cause pivot arm 26 to rotate when the bird sits on feeder 60 or corn 56, the greater weight of a squirrel 86 will cause pivot arm 26 to rotate before squirrel 86 can get to corn 56 or feeder 60. When feeding apparatus 10 is adjusted for the weight of a squirrel 86, the squirrel will have to get very near end 48 of pivot arm 26 before pivot arm 26 rotates. Squirrel 86 may reach corn 56 or feeder 60 by either climbing mounting post 12 to pivot arm 26 or by jumping on the lower end 44 of pivot arm 26 and climbing up the pivot arm. In either instance, when the squirrel reaches a point near the end 48 of pivot arm 26, the squirrel will have to reach around pivot arm 26 to get to corn 56 or feeder 60. This is due to the substantially vertical hanging position of corn 56 or feeder 60. When the squirrel 86 reaches around pivot arm 26 to get to the food, the motion and weight displacement will upset the balance of pivot arm 26, causing it to rotate in either of the rotational direction arrows 88 or 90, depending upon which way the squirrel reaches around pivot arm 26.

Due to the smoothness of PVC pipe, the squirrel must use all four of its paws to grasp the pipe in order to maintain a grip. This leaves only the squirrel's mouth available for gathering food such as corn 56. Once the squirrel 86 has gathered some corn 56, it must release its grip on the PVC with at least its front paws in order to eat. When this has been done, squirrel 86 will no longer be able to maintain a grip on the PVC, and must jump off the feeding apparatus 10. When the squirrel jumps off the apparatus 10, the counterweight will cause the pivot arm to rotate so that end 44 once again is in the position closer to the ground and end 48 and consequently the food are up further in the air, in the original position. A typical squirrel, in order to eat its fill, may often climb the animal feeding apparatus 10 in excess of twenty times to get enough food. Because the squirrel 86 must jump off the feeding apparatus 10 in order to eat the food, the antics of the squirrel will provide entertainment and amusement for spectators.

To allow squirrels to discover the food of the feeding apparatus 10, counterweight 68 may be adjusted so that end 48 with food or a feeder attached thereto is rotated to a position near the ground. Squirrels 86 or other animals will then be able to initially reach the food without climbing onto the apparatus. Counterweight 68 may be adjusted so that once an amount of food has been eaten, the pivot arm will rotate place the end 48 in its usual position elevated from the ground. Once the squirrels 86 know that food is present, they will attempt to reach it, putting feeding apparatus to use as described above.

The feeding apparatus 10 is adapted for mounting in the ground in a substantially upright position by insertion of ground-engaging end 12a of mounting post 12 and depending leg 14 into holes dug for that purpose. The two leg anchoring provides the apparatus 10 with stability.

The detailed description outlined above is considered to be illustrative only of the principles of the invention. Numerous changes and modifications will occur to those skilled in the art, and there is no intention to restrict the scope of the invention to the detailed description. The preferred embodiment of the invention having been described in detail, the scope of the invention should be defined by the following claims.

What is claimed:

1. An animal feeding apparatus, comprising:
   a mounting post having a first end and a second end, said second end being adapted for mounting on the ground to support said post in a substantially upright position of use;
   a pivot arm having a first end and a second end, said pivot arm rotatably mounted to said mounting post;
   means for supporting animal food secured to said first end of said pivot arm;
   an adjustable counterweight; and
   mounting means movably attaching said adjustable counterweight on said pivot arm for adjustable, sliding movement thereon.

2. The animal feeding apparatus of claim 1 wherein said mounting means comprises:
   a C-shaped mounting clip attached to said counterweight, and engaging said pivot arm by a deformable friction fit.

3. The animal feeding apparatus of claim 1 wherein said means for supporting food comprises an eye hook attached to said first end of said pivot arm.

4. The animal feeding apparatus of claim 3 wherein said means for supporting food further comprises a second eye hook engaging said eye hook.

5. The animal feeding apparatus of claim 1 and further comprising:
   a bird feeder suspended from said means for supporting animal food.

6. The animal feeding apparatus of claim 5 wherein said bird feeder comprises:
   a plastic beverage bottle having a cap screwed onto its upper end, said bottle having feed holes at its bottom; and
   a tray attached to said bottom of said bottle to receive feed therefrom.

7. The animal feeding apparatus of claim 6 wherein said means for supporting animal food comprises an eye hook screwed into said bottle cap and attached to said first end of said pivot arm.

8. The animal feeding apparatus of claim 1 wherein said pivot arm is attached to said mounting post at a forty-five degree angle to said mounting post by said mounting member.

9. The animal feeding apparatus of claim 1 wherein said mounting post and said pivot arm are constructed of PVC pipe.

10. The animal feeding apparatus of claim 9 wherein said PVC pipe is schedule 40 pipe.

11. The animal feeding apparatus of claim 9 wherein said PVC pipe has a diameter in a range of approximately ½ inch to 2 inches.

12. The animal feeding apparatus of claim 9 wherein said PVC pipe has a diameter of approximately ¾ inch.

13. The animal feeding apparatus of claim 1 wherein said second end of said mounting post is adapted for mounting in the ground by a depending leg spaced apart from and parallel to said mounting post by a connecting member; and
   wherein said mounting post and said depending leg are insertable into the ground to provide a free standing support for said feeding apparatus.

14. The animal feeding apparatus of claim 1, and further comprising:
   a mounting member mounting said pivot arm to said mounting post, said member extending at an angle from said post at an above ground elevation thereon when said post is in said position of use.

15. The animal feeding apparatus of claim 14, wherein said mounting member extends at an angle greater than 90° with respect to said substantially upright position of said mounting post.

16. An animal feeding apparatus, comprising:

a mounting post having a first end and a second end, said second end being adapted for mounting on the ground to support said post in substantially upright position of use;

a mounting member extending from said post at an angle greater than 90° with respect to said substantially upright position of said mounting post and at an above ground elevation thereon when said post is in said position of use;

a pivot arm having a first end and a second end, said pivot arm rotatably mounted to said mounting member; and means for supporting animal food secured to said first end of said pivot arm.

* * * * *